: US 8,567,842 B2
(45) Date of Patent: Oct. 29, 2013

(12) United States Patent
Line et al.

(54) TRANSVERSE SLIDING/ACCOMMODATION EASY ENTRY SEAT

(75) Inventors: Johnathan Andrew Line, Northville, MI (US); John W. Jaranson, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 333 days.

(21) Appl. No.: 12/850,878

(22) Filed: Aug. 5, 2010

(65) Prior Publication Data
US 2012/0032466 A1 Feb. 9, 2012

(51) Int. Cl.
*B60N 2/06* (2006.01)

(52) U.S. Cl.
USPC ..................... 296/65.11; 296/65.01

(58) Field of Classification Search
USPC ............... 296/63, 65.01, 65.11, 65.12, 65.13, 296/65.15; 297/68, 105, 107, 112, 238, 297/284.11, 344.24, 423.28, 423.3, 452.4
See application file for complete search history.

(56) References Cited

U.S. PATENT DOCUMENTS

| | | | | | |
|---|---|---|---|---|---|
| 2,587,679 | A | * | 3/1952 | Atkinson | 296/68 |
| 2,670,987 | A | * | 3/1954 | Walsh | 296/65.12 |
| 2,753,947 | A | * | 7/1956 | Mach | 180/89.18 |
| 2,758,872 | A | * | 8/1956 | Gerhard et al. | 296/65.12 |
| 3,016,265 | A | * | 1/1962 | Cobb | 297/88 |
| 3,071,407 | A | * | 1/1963 | Sloan | 296/65.12 |
| 3,761,124 | A | * | 9/1973 | Weik et al. | 297/112 |
| 3,944,277 | A | * | 3/1976 | Cyphert | 296/68 |
| 4,334,709 | A | * | 6/1982 | Akiyama et al. | 297/284.11 |
| 4,479,752 | A | * | 10/1984 | Todd | 414/462 |
| 4,773,703 | A | * | 9/1988 | Krugener et al. | 297/284.1 |
| 5,042,864 | A | * | 8/1991 | Mochizuki | 296/65.07 |
| 5,171,062 | A | * | 12/1992 | Courtois | 297/340 |
| 5,474,353 | A | | 12/1995 | Koester et al. | |
| 5,524,952 | A | * | 6/1996 | Czech et al. | 296/65.12 |
| 5,746,465 | A | * | 5/1998 | Jones et al. | 296/65.03 |

(Continued)

FOREIGN PATENT DOCUMENTS

| | | | |
|---|---|---|---|
| DE | 3618673 | A1 * | 12/1987 |
| DE | 4412617 | A1 * | 10/1994 |

(Continued)

OTHER PUBLICATIONS

Oshinoya, Yasuo et al., "Simulation Study on Active Seat Suspension for a Small Vehicle," Proc. Schl. Eng. Tokai Univ., Ser. E, vol. XXVIII, 2003, pp. 27-31, Japan.

*Primary Examiner* — Glenn Dayoan
*Assistant Examiner* — Paul Chenevert
(74) *Attorney, Agent, or Firm* — Vichit Chea; Price Heneveld LLP

(57) ABSTRACT

A vehicle having a door opening defining a threshold. A slide system includes a track operably connected to the vehicle. A slide is linearly moveable relative to the track. A seat is operably connected to the slide. The slide is laterally movable between a retracted position that corresponds with the seat being positioned inside the vehicle and an extended position that corresponds with the seat being disposed in the threshold. The seat may translate from a rearward position to a forward position in order to facilitate the clearance of the seat through the threshold. A portion of the seat may rotate downward to facilitate clearance of the seat through the threshold. Alternatively, a forward portion of the seat may move forward and rearward relative to a rearward portion of the seat.

11 Claims, 6 Drawing Sheets

(56) References Cited

U.S. PATENT DOCUMENTS

| | | | |
|---|---|---|---|
| 6,024,398 A * | 2/2000 | Horton et al. | 296/65.07 |
| 6,454,353 B1 * | 9/2002 | Knaus | 297/284.11 |
| 6,601,918 B2 * | 8/2003 | Mattsson | 297/284.11 |
| 7,195,316 B2 * | 3/2007 | Shimasaki et al. | 297/284.11 |
| 7,207,765 B1 | 4/2007 | Egan | |
| 7,316,441 B2 * | 1/2008 | Iwatani et al. | 296/65.12 |
| 7,597,398 B2 * | 10/2009 | Lindsay | 297/284.11 |
| 7,866,723 B2 * | 1/2011 | Ninio et al. | 296/65.11 |
| 8,245,994 B2 * | 8/2012 | Yamada et al. | 248/429 |
| 2006/0152030 A1 | 7/2006 | Van Dyk et al. | |
| 2008/0030060 A1 | 2/2008 | Schwingenschlogel et al. | |
| 2009/0134681 A1 | 5/2009 | Quast et al. | |
| 2009/0179450 A1 | 7/2009 | Brown et al. | |

FOREIGN PATENT DOCUMENTS

| | | | |
|---|---|---|---|
| EP | 353210 A1 * | 1/1990 | |
| EP | 587523 A1 * | 3/1994 | |
| JP | 55114621 A * | 9/1980 | |
| JP | 58183320 A * | 10/1983 | |
| JP | 61160325 A * | 7/1986 | |
| JP | 01095948 A * | 4/1989 | |
| JP | 05220025 A * | 8/1993 | |
| WO | 2009127290 A1 | 10/2009 | |

* cited by examiner

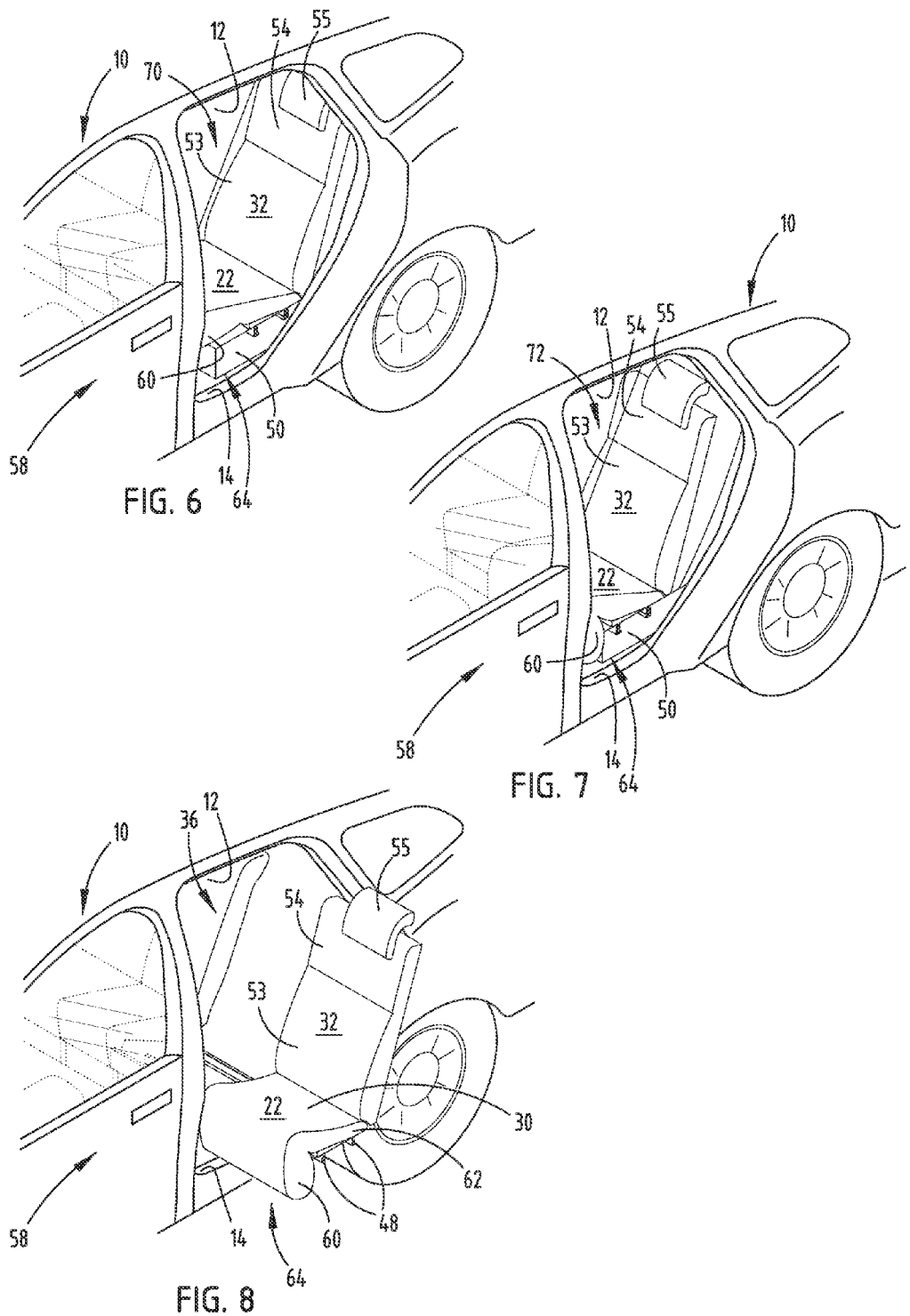

US 8,567,842 B2

TRANSVERSE SLIDING/ACCOMMODATION EASY ENTRY SEAT

FIELD OF THE INVENTION

The present invention generally relates to a transverse sliding easy entry seat system, and more particularly relates to a transverse sliding seat that facilitates ease of ingress and egress by a user.

BACKGROUND OF THE PRESENT INVENTION

Accessibility to the interior area of a vehicle can sometimes be difficult for children, individuals having a physical handicap, and the elderly. Systems that assist users who access the vehicle are often large and complex and designed to accommodate secondary devices, such as wheelchairs or motorized personal power chairs. These systems are not generally used in standard vehicles having standard seating arrangements.

SUMMARY OF THE PRESENT INVENTION

One aspect of the present invention includes a vehicle having a door opening defining a threshold. A slide system includes a track operably connected to the vehicle. A slide is linearly moveable relative to the track and a seat is operably connected to the slide. The slide is laterally movable between a retracted position that corresponds with the seat being positioned inside the vehicle and an extended position that corresponds with the seat being disposed in the threshold.

Another aspect of the present invention includes a vehicle seat system having a slide system including an extension member. A seat base is operably connected with the extension member. A seat back is operably connected to the seat base and operable between a forward position and a rearward position. A motor is operably coupled to the extension member. The motor is operable to move the seat between a retracted position and a laterally extended position.

Yet another aspect of the present invention includes a seating unit having a seat base. A seat back is operably coupled with the seat base and operable between a forward position and a rearward position. A slide system includes an extendable member operably connected with the seat base and adapted to move the seating unit laterally when the seat back is in the forward position.

In yet another embodiment of the present invention, a vehicle seat system having a transverse sliding device allows for lateral translation of a seat from a retracted position inside of a vehicle to an extended position at least partially outside of the vehicle. The slide system may be moved from the retracted position to the extended position manually or by a motorized system operably connected with the slide system. The slide system provides an affordable, efficient, and easy to use method of assisting a user, such as a handicap person, child, or an elderly person from entering or exiting the vehicle.

These and other aspects, objects, and features of the present invention will be understood and appreciated by those skilled in the art upon studying the following specification, claims, and appended drawings.

BRIEF DESCRIPTION OF THE DRAWINGS

FIG. 6 is a top perspective partial view of one embodiment of a vehicle incorporating a second embodiment of a transverse sliding entry seat;

FIG. 7 is a top perspective partial view of one embodiment of a vehicle incorporating a second embodiment of the transverse sliding entry seat in a forward position;

FIG. 8 is a top perspective partial view of one embodiment of a vehicle incorporating a second embodiment of the transverse sliding entry seat in an extended position;

DETAILED DESCRIPTION OF EMBODIMENTS

Figure 1:
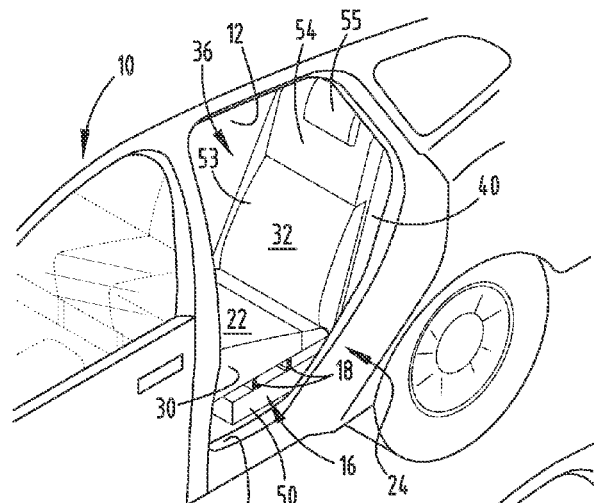
FIG. 1 is a top perspective partial view of one embodiment of a vehicle incorporating one embodiment of a transverse sliding entry seat.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, the reference numeral 10 generally designates a vehicle having a door opening 12 defining a threshold 14. A slide system 16 includes a track 18 operably connected to the vehicle 10. A slide 20 (FIG. 5) is linearly moveable relative to the track 18. A seat 22 is operably connected to the slide 20. The slide 20 is laterally movable between a retracted position 24 that corresponds with the seat 22 being positioned inside the vehicle 10 and an extended position 26 (FIG. 3) that corresponds with the seat 22 being disposed in the threshold 14.

Figure 2:
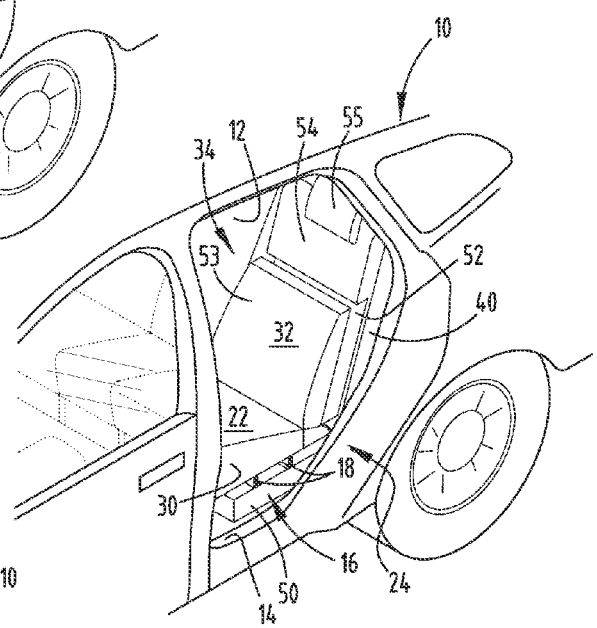
FIG. 2 is a top perspective partial view of one embodiment of a vehicle incorporating one embodiment of the transverse sliding entry seat in a forward position.
Figure 3:
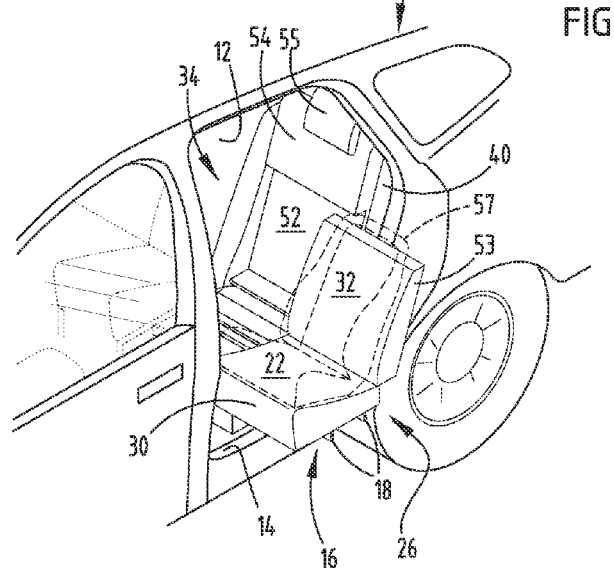
FIG. 3 is a top perspective partial view of one embodiment of a vehicle incorporating one embodiment of the transverse sliding entry seat in an extended position.
Figure 3A:
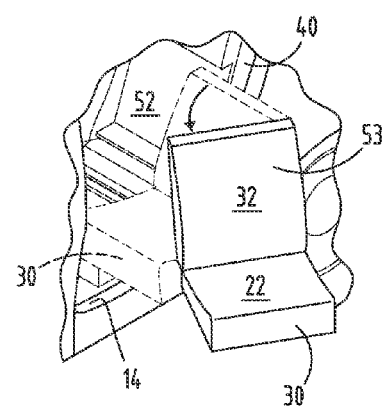
FIG. 3A is a top perspective partial view of the entry seat of FIG. 3 rotated about a distal end of an extendable member.
Figure 4:
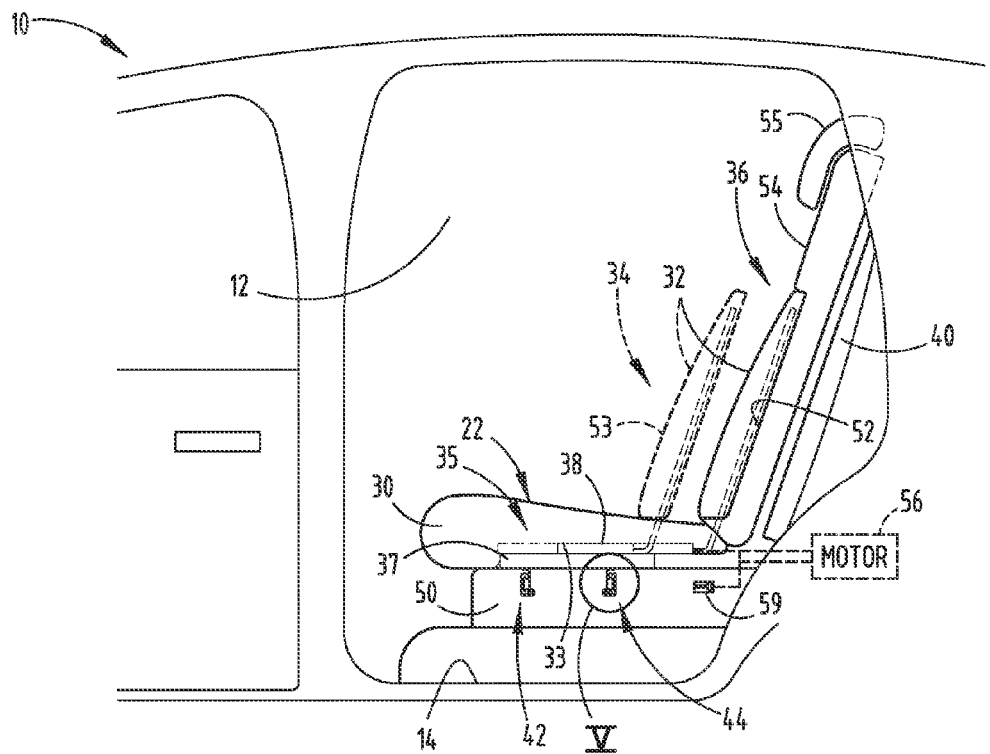
FIG. 4 is a partial side elevational view of the seat assembly depicted in FIG. 3.

Referring again to FIGS. 1-3, one embodiment of the transverse sliding system 16 is illustrated, which is designed for use in a rear seating area of the vehicle 10. The seat 22 is generally adjacent to the door threshold 14 and may have a variety of constructions. In the illustrated embodiment, the seat 22 includes a base 30 and a seat back 32, wherein the base 30 is adapted for supporting the buttocks and lower legs of a user and the seat back 32 is adapted to support the back of a user. A bottom side 33 of the base 30 is operably connected to a fore/aft sliding system 35. The fore/aft sliding system 35 is designed to move the base 30 and the seat back 32 between a forward position 34 and a rearward position 36 (FIG. 4). The fore/aft sliding system 35 includes a stationary member 37 disposed on the sliding system 16. The stationary member 37 includes a dynamic member 38 that is designed for linear translation over the stationary member 37. It is contemplated that the fore/aft sliding system 35 could be a rail and slide system, pneumatic system, or any other system designed for linear movement, as known in the art. Further, it is contemplated that the seat back 32 may be pivotally connected to the seat base 30, or may be connected to an internal backrest 40 inside the vehicle 10. In either instance, the seat back 32 moves forward inside the vehicle 10 so that the entire seat 22 may move laterally to a position in the threshold 14 or at least partially outside the vehicle 10 (FIG. 3).

In the illustrated embodiment, the base 30 is supported over first and second rails 42, 44 (FIG. 4) that extend transversely relative to the longitudinal extent of the fore/aft sliding system 35 and the vehicle 10. The rails 42, 44 include the slides 20, ball bearings 45 (FIG. 5), and the tracks 18. The slides 20 are linearly translatable over the tracks 18, which extend perpendicular to the longitudinal extent of the vehicle 10. The slides 20 interface with the ball bearings 45. Similarly, the tracks 18 interface with the ball bearings 45. As the slides 20 move outward during movement of the seat 22 from the retracted position 24 to the extended position 26, the ball bearings 45 roll between the slides 20 and track 18. The illustrated embodiment shows the base 30 connected to the slides 20, which move over the tracks 18 to displace the seat 22 when the seat 22 is in the forward position 34. When the seat 22 is in the forward position 34, the seat 22 may be moved from the retracted position 24, wherein the seat 22 is entirely in the vehicle 10, to the extended position 26, wherein the seat 22 is disposed in the threshold 14 or at least a portion of the seat 22 extends outside of the vehicle 10. It is contemplated that the seat 22 may be pivotally connected to a distal end 48 of each slide 20, such that the seat 22 can rotate relative to each slide 20 when the slides 20 are in the extended position 26.

Figure 5:
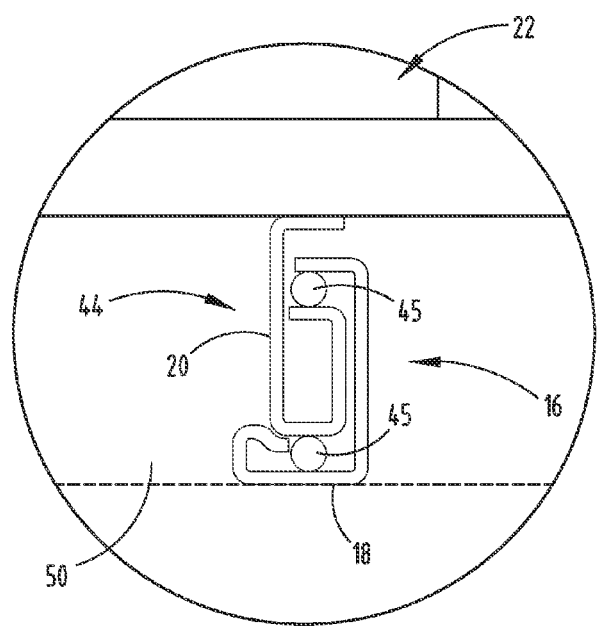
FIG. 5 is a side elevational view of area V of FIG. 4.

Referring now to FIGS. 4 and 5, the rails 42, 44 are generally disposed in a support structure 50 that carries the base 30 and is fixedly connected to the vehicle 10. The track 18 of each rail 42, 44 is in fixed connection with the support structure 50, such that when the seat 22 moves with the slides 20 to the extended position 26, the seat 22 maintains the same elevation above the support structure 50 as if the seat 22 were positioned directly above the support structure 50 in the retracted position 24. The slides 20 of each rail 42, 44 are operably connected to a bottom side of the seat 22 such that linear movement of the slide 20 relative to the track 18 causes the seat 22 to move linearly laterally from the retracted position 24 to the extended position 26. When each slide 20 begins moving outward to place the seat 22 in the extended position 26, the ball bearings 45 rotate over each track 18, allowing for a smooth gliding transition of the seat 22 from the retracted position 24 to the extended position 26. It is contemplated that the rails 42, 44 may be disposed in the support structure 50 as shown in FIGS. 4 and 5, or may rest on top of the support structure 50 among other possible design alternatives.

Referring again to FIGS. 1-4, the seat 22 is in the rearward position 36, the seat back 32 is received in a cavity 52 disposed in the interior backrest 40. The interior backrest 40 may contain a cavity for all embodiments and is able to be either fixed or movable in relation to the seat 22. The interior backrest 40 maintains a position in the interior of the vehicle 10 and does not extend outside the vehicle 10. However, it is contemplated that the seat back 32 may take on a variety of different constructions which may incorporate more or less of the interior backrest 40. In an alternative embodiment (not shown) the seat back 32 includes both lower and upper back cushions 53, 54, as well as a headrest 55, which are adapted for lateral movement in and out of the vehicle 10 to assist or aid a child, elderly person, or handicap person. As shown in FIG. 3, the base 30 and seat back 32 are designed to accommodate a child's seat 57.

To effect movement of the base 30 and seat back 32 to the forward position 34 and to the retracted position 24, the entire slide system 16 may be operably connected with a motorized system 56 that is operably connected to a toggle switch 59. The motorized system 56 effectively moves the seat 22 from the rearward position 36 to the forward position 34 and also from the retracted position 24 to the extended position 26. Alternatively, as shown in the illustrated embodiment, the seat 22 may be moved from the rearward position 36 to the forward position 34 manually by a user and also from the retracted position 24 to the extended position 26.

Referring now to FIGS. 6-8, another embodiment of a transverse sliding system 58 is illustrated, wherein the base 30 and seat back 32 are laterally movable to assist a user in entering or exiting the vehicle 10. Similar to the embodiment discussed above, the seat back 32 may be connected to the base 30. The seat back 32 is adapted to move with the seat base 30 when the seat base 30 moves with the distal end 48 of each slide 20 when the slides 20 move from the retracted position 24 to the extended position 26. The seat 22 may be rotatable about the distal end 48 of the slides 20 to allow for rotation of the seat 22 relative to the slides 20 (FIG. 8). Rotation of the seat 22 increases the ease of ingress and egress for the user.

Figure 9:
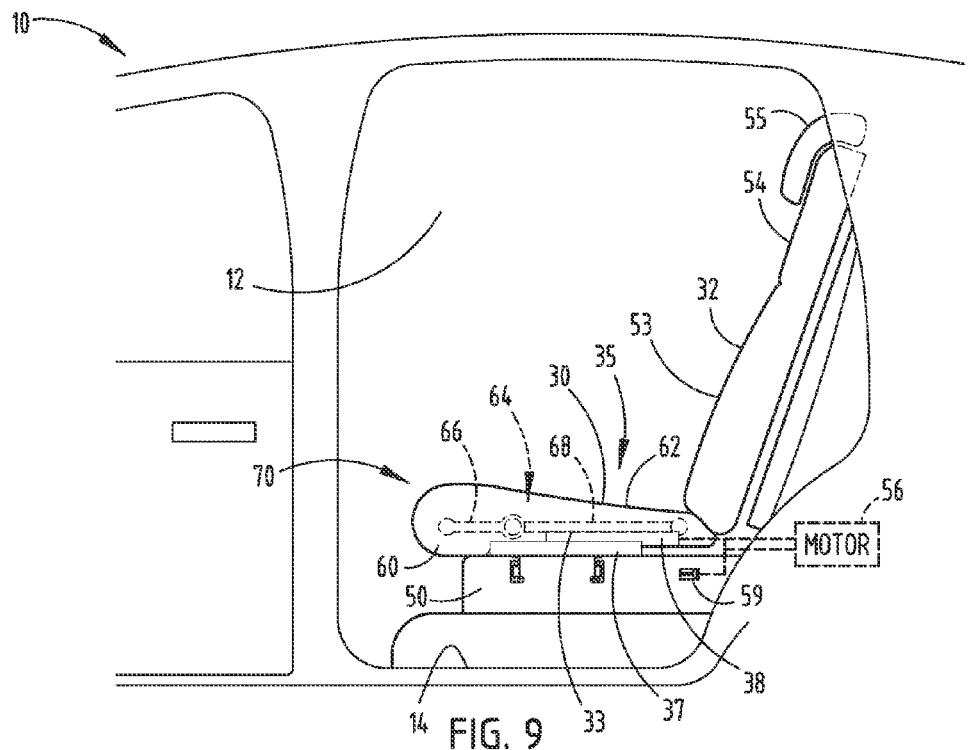
FIG. 9 is a side elevational view of the transverse sliding easy entry seat of FIG. 6.
Figure 10:
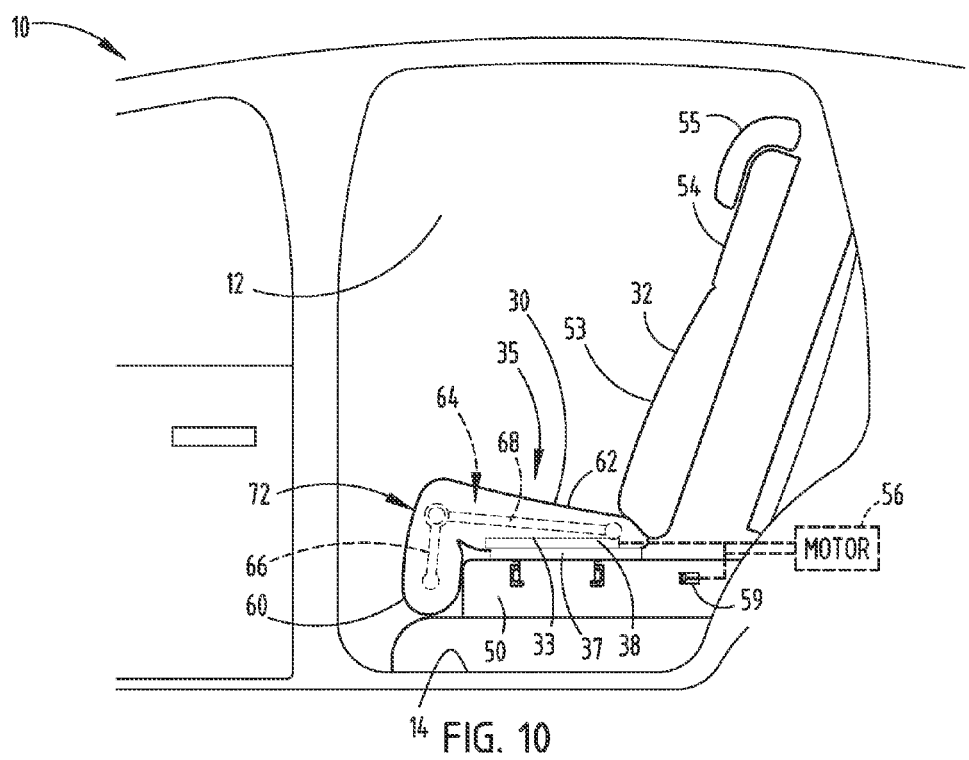
FIG. 10 is a side elevational view of the seat assembly of FIG. 7.

Referring now to FIGS. 6-10, the illustrated embodiment of the transverse sliding system 58 has a base 30 that includes a front portion 60 and a rear portion 62. A multi-bar pivot system 64 connects the front portion 60 with the rear portion 62 and assists in positioning the seat 22 in the forward position 34 so that the seat 22 may be moved along with the slides 20 to the extended position 26 from the retracted position 24. FIGS. 6 and 9 illustrate the present embodiment of the seat 22 in the rearward position 36. To affect movement of the seat 22 to the extended position 26 (FIG. 8), the seat 22 is first moved to the forward position 34 (FIGS. 7 and 10). When the seat 22 is moved to the forward position 34, the front portion 60 of the seat base 30 rotates downward relative to the rear portion 62 of the base 30, which maintains a substantially horizontal orientation. While the front portion 60 rotates downward, the rear portion 62 of the seat 22 and the seat back 32 moves forward to allow for lateral movement of the seat 22 to the extended position 26, wherein at least a portion of the seat 22 is disposed outside of the vehicle 10. To accomplish rotation of the front portion 60 downward, the multi-bar pivot system 64 includes a first bar 66 that is disposed in the front portion 60 of the seat base 30 and a second bar 68 that is disposed in the rear portion 62 of the seat base 30. The first and second bars 66, 68 maintain a substantially horizontal orientation 70 when the seat back 32 is in the rearward position 36. However, when the seat 22 moves to the forward position 34, the first bar 66, and consequently the front portion 60, rotates downward to a substantially vertical orientation 72 so that the seat back 32 can clear the door threshold 14, thereby allowing clearance for the seat 22 to pass out of the door threshold 14 laterally when moving from the retracted position 24 to the extended position 26.

Movement of the first bar 66 relative to the second bar 68 may be done manually by a user or may be conducted by the motorized system 56 by way of the toggle switch 59 disposed on a side of the seat 22 or elsewhere in the vehicle 10. The motorized system 56 may also be adapted to move the seat 22 from the retracted position 24 to the extended position 26. It will be understood by one having ordinary skill in the art how the motorized system 56 would be operably connected with the seat 22 to assist the user entering or exiting the vehicle 10.

Referring again to FIGS. 9 and 10, it is contemplated that the base 30 may be moved from the rearward position 36 to the forward position 34 until the base is squarely over the first and second rails 42, 44. When squarely over the rails 42, 44 the base is in the forward position 34 such that the seat 22 can be moved between the refracted position 24 and the extended position 26. In another embodiment, it is contemplated that the rails 42, 44 move with the base 30 between the forward position 34 and the rearward position 36. Only when the base 30 has reached the forward position 34, are the rails 42, 44 actuated, such that the slides 20 can move over the track 18 and the base 30 can move between the extended position 26 and the retracted position 24.

It is contemplated that the front portion 60 of the base 30 may be operably connected with the motorized system 56 that rotates the front portion 60 downward when the seat 22 is moving to the forward position 34. In another embodiment, it is contemplated that the first bar 66 is pivotally connected with the second bar 68, and when the seat 22 is moved to the forward position 34, the first bar 66 (and consequently the front portion 60) rotates downward relative to the second bar 68 by way of gravity. As shown in FIG. 10, a stretchable cushion and coverstock are disposed over the pivotal coupling; of the first bar 66 and second bar 68. After the seat 22 has moved to the forward position 34, the base 30 is now in position to move laterally between the refracted position 24 and the extended position 26.

If the motorized system 56 is utilized to move the seat from the rearward position 36 to the forward position 34, then the toggle switch 59 is moved forward and the first bar 66 begins to rotate downward with the front portion 60. At the same time, the second bar 68 and the rear portion 62 slide forward until the seat 22 is in the forward position 34. After the seat 22 is in the forward position 34, the toggle switch 59 may then be pushed downward to move the seat 22 from the retracted position 24 to the extended position 26. To move the seat 22 back into the vehicle 10 in the rearward position 36, the reverse steps are taken by the user.

Figure 11:
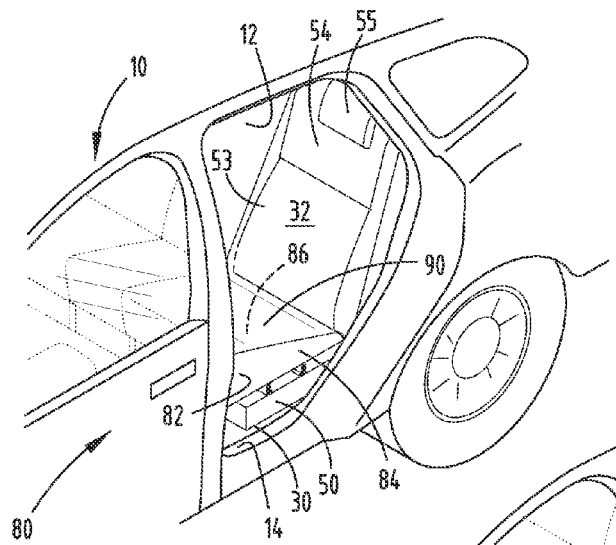
FIG. 11 is a top perspective partial view of one embodiment of a vehicle incorporating a third embodiment of a transverse sliding entry seat.
Figure 12:
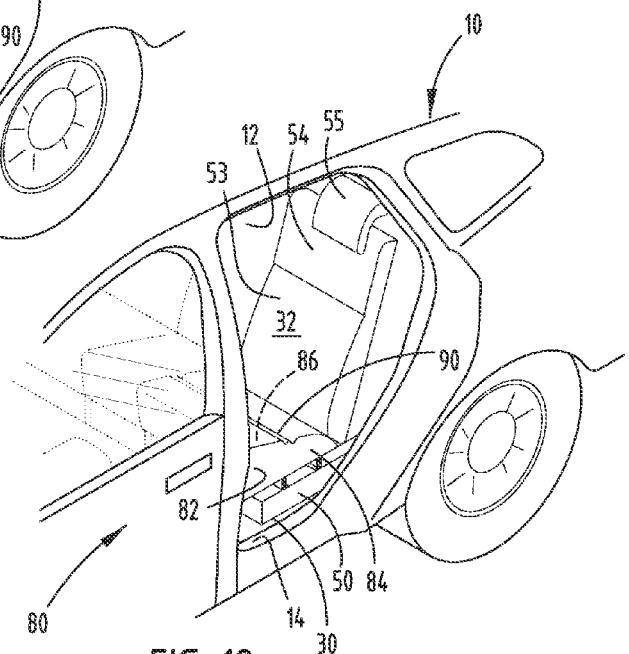
FIG. 12 is a top perspective partial view of one embodiment of a vehicle incorporating a third embodiment of the transverse sliding entry seat in a forward position.
Figure 13:
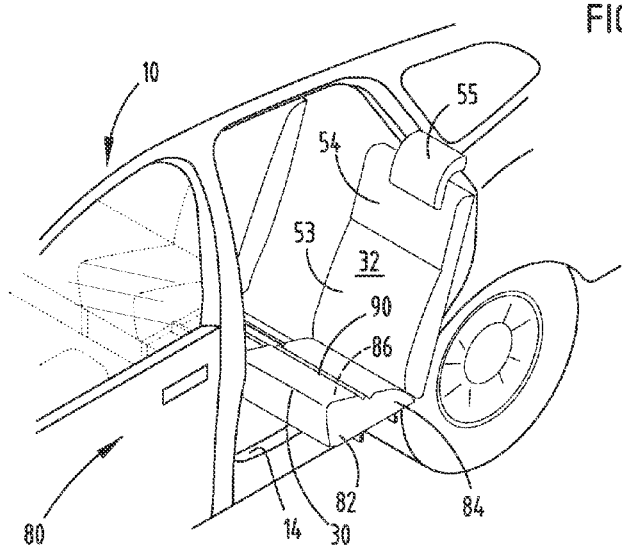
FIG. 13 is a top perspective partial view of one embodiment of a vehicle incorporating a third embodiment of the transverse sliding entry seat in an extended position.

Referring now to FIGS. 11-13, yet another embodiment of the present invention is illustrated. The illustrated embodiment includes a transverse sliding system 80 that is designed for use in the vehicle 10. The seat 22 is generally adjacent to the door threshold 14 and may have a variety of constructions. In the illustrated embodiment, the seat 22 includes the base 30 and the seat back 32, wherein the base 30 is adapted for supporting the buttocks and lower legs of a user, and the seat back 32 is adapted to support the back of a user. The seat back 32 is movable between the forward position 34 and the rearward position 36. It is contemplated that the base 30 may be pivotally connected to the seat back 32. The seat back 32 is adapted to move forward relative to the base 30 so that the seat 22 may move laterally to a position at least partially outside the vehicle 10 (FIG. 13). Similar to the previously discussed embodiments, the base 30 is supported over the first and second rails 42, 44 that extend transversely relative to the longitudinal extent of the vehicle 10. The first and second rails 42, 44 include slides 20 that are linearly translatable over the tracks 18. When the seat 22 is in the forward position 34, the seat 22 is movable between the retracted position 24, wherein the seat 22 is entirely in the vehicle 10, and the extended position 26, wherein at least a portion of the seat 22 extends outside of the vehicle 10. It is contemplated that the seat 22 may be pivotally connected to the slide 20. The seat base 30 includes a front portion 82, a rear portion 84, and a tension spring 86 disposed between the front portion 82 and the rear portion 84.

In an alternative embodiment, the motorized system 56, which is operably connected with the seat 22, moves the seat 22 forward and is assisted by the tension spring 86. To move the seat 22 to the forward position 34, the user pushes the toggle switch 59 forward, which causes the motorized system 56 to move the seat 22 forward. To move the seat 22 to the rearward position 36, a user pushes the toggle switch 59 back, which causes the motorized system 56 to move the seat 22 back. To place the seat 22 back in the vehicle 10, the same steps are made in the reverse order.

Figure 14:
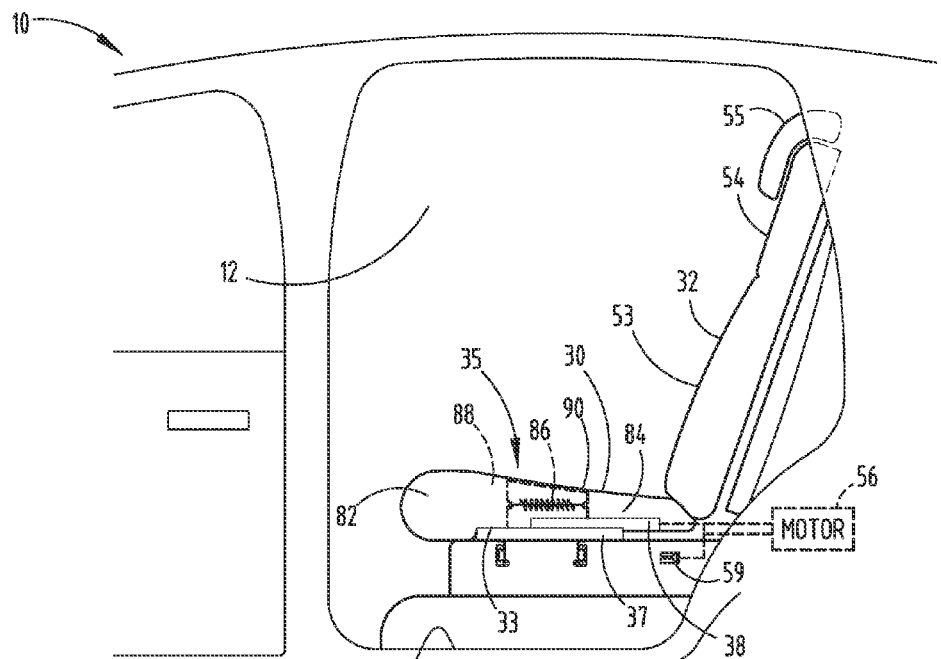
FIG. 14 is a side elevational view of the transverse sliding easy entry seat of FIG. 11.
Figure 15:
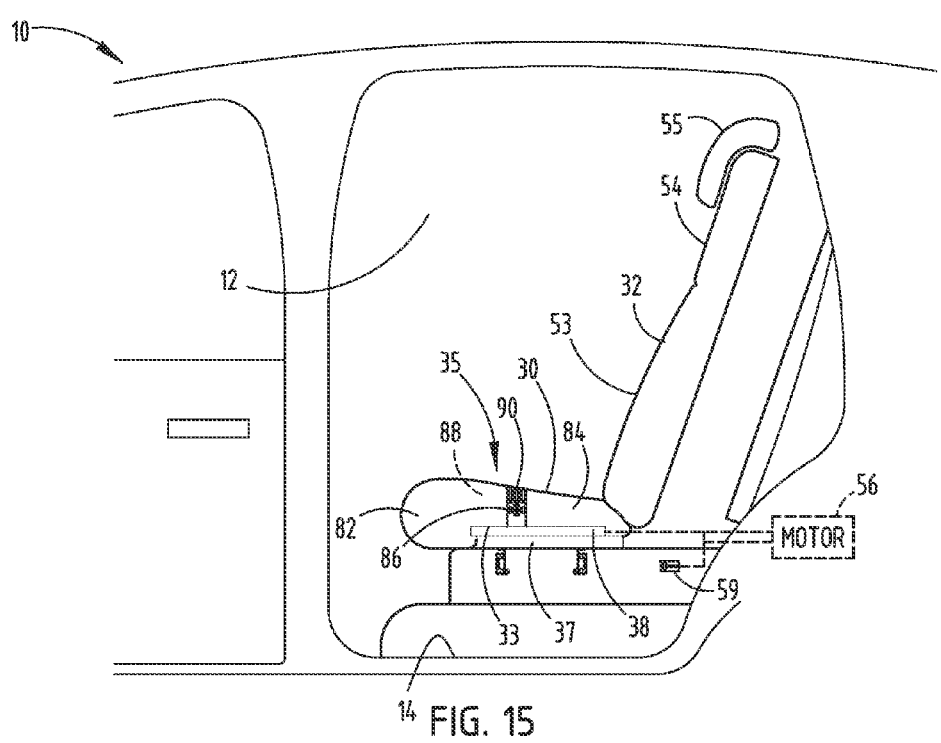
FIG. 15 is a side elevational view of the seat assembly of FIG. 12.

Referring now to FIGS. 14 and 15, when the seat 22 is in the rearward position 36, the tension spring 86 is extended, such that the front portion 82 and the rear portion 84 are not adjacent. If a user wishes to move the seat 22 forward manually, stored energy in the tension spring 86 assists the user in moving the seat 22 to the forward position 34. Specifically, the tension spring 86 pulls the rear portion 84 and the seat back 32 forward. A stretchable cushion 88 and a coverstock 90 are disposed over the tension spring 86 to allow for expansion and contraction of the seat base 30, and more specifically, allow for movement of the rear portion 84 relative to the front portion 82. When the rear portion 84 is adjacent to the front portion 82, the seat back 32 is forward, and the entire seat 22 is in the forward position 34, such that the seat 22 may be moved laterally between the retracted and extended positions 24, 26. Stated differently, the seat 22 is now in condition to move laterally because it clears the threshold 14 of the vehicle 10.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seating unit comprising:
 a seat base;
 a seat back having a lower portion operably coupled with the seat base, the seat base and lower portion being operable between a deployed position and a stored position;
 a slide system having an extendable member operably connected with the seat base and adapted to move the seat base and the lower portion of the seat back laterally outside of a vehicle when the lower portion of the seat back and the seat base are in the deployed position, the seat base being rotatable about the distal end of the extendable member when the extendable member is extended, and wherein the lower portion and seat base are translated forward before being extended laterally.

2. The vehicle of claim 1, wherein the extendable member of the slide system includes first and second tracks operably connected to the vehicle and first and second slides linearly translatable relative to the first and second tracks, respectively.

3. The vehicle of claim 1, wherein the seat back defines a portion of an interior backrest that withdraws from the interior backrest when moved to the forward position.

4. The vehicle of claim 1, wherein the seat base has a front portion, a rear portion, and a tension spring disposed therebetween, and wherein the tension spring draws the rear portion forward when the seat back is moved to the forward position.

5. The vehicle of claim 1, wherein the seat base has a front portion, a rear portion, and a multi-bar pivot system that operably couples the front portion and rear portion, and wherein the multi-bar pivot system operates to move the front portion of the seat base downward and the rear portion forward, at the same time, when the seat back is moved to the forward position.

6. A vehicle seat system comprising:
 a slide system having an extension member;
 a seat base operably connected with the extension member;
 an upper seat back; and
 a dynamic lower seat back operably connected to the seat base and operable between a deployed position and a stored position, wherein the lower seat back and seat base are translated forward from the stored position to the deployed position before being moved to a laterally extended position.

7. The vehicle seat system of claim 6, wherein the extension member includes a slide linearly translatable relative to a stationary track connected with the vehicle.

8. The vehicle seat system of claim 6, wherein the dynamic lower seat back defines a portion of an interior backrest that withdraws from the upper seat back when moved to the forward position.

9. A vehicle comprising:
 a door opening defining a threshold;
 a slide system including a track and slide, wherein the slide system is operably connected to the vehicle; and
 a seat positioned below an upper back support and a lower back support, wherein the seat is operably connected to the slide, and wherein the slide is laterally moveable over the track between a retracted position that corresponds with the seat and lower back support being positioned inside the vehicle adjacent the upper back support and an extended position that corresponds with the seat and the lower back support being disposed in the threshold away from the upper back support, and wherein the seat is translated forward from a stored position to a deployed position prior to movement of the seat laterally to the extended position.

10. The vehicle of claim 9, wherein the slide cannot be moved to the extended position when the seat is in the stored position.

11. The vehicle of claim 9, further comprising:
 an actuating motor operably connected with the slide system and adapted to move the slide between the extended and retracted positions.

* * * * *